United States Patent [19]

Hussain

[11] Patent Number: 5,053,447
[45] Date of Patent: Oct. 1, 1991

[54] POLYAMIDE-BASED THERMOPLASTIC FORMULATION

[75] Inventor: Saadat Hussain, Baton Rouge, La.
[73] Assignee: Ethyl Corporation, Richmond, Va.
[21] Appl. No.: 442,891
[22] Filed: Nov. 29, 1989
[51] Int. Cl.$^5$ ............................................. C08K 3/22
[52] U.S. Cl. ................................... 524/412; 524/464; 524/469; 524/494
[58] Field of Search ................ 524/412, 464, 469, 494

[56] References Cited

U.S. PATENT DOCUMENTS 3,331,797  7/1967  Kopetz et al. ...................... 524/469
3,839,140  10/1974 Tyler et al. ........................... 524/371

Primary Examiner—Paul R. Michl
Assistant Examiner—Edward J. Cain
Attorney, Agent, or Firm—Edgar E. Spielman, Jr.

[57] ABSTRACT

This invention relates to thermoplastic formulations which comprise: (1) at least 50 weight percent, based upon the total weight of the formulation, unreinforced nylon selected from nylon 6,6 nylon 6 or mixtures thereof, and (2) a sufficient amount of decabromodiphenyl ethane to provide a melt index, as measured by ASTM D 1238-79, 265° C./1200 grams, which is higher than the like-measured melt index of such nylon alone.

This invention also relates to thermoplastic formulations which comprise: (1) at least 50 weight percent, based upon the total weight of the formulation, reinforced nylon selected from glass reinforced nylon 6,6, glass reinforced nylon 6 or mixtures thereof, and (2) a sufficient amount of decabromodiphenyl ethane to provide a melt index, as measured by ASTM D 1238A, 275° C./550 grams, which is higher than the like-measured melt index of such reinforced nylon alone.

12 Claims, No Drawings

POLYAMIDE-BASED THERMOPLASTIC FORMULATION

BACKGROUND OF THE INVENTION

This invention relates to polyamide-based thermoplastic formulations having improved melt-flow characteristics. Two of the most commercially significant polyamides are poly(hexamethyleneadipamide) and polycaprolactam. These two polyamides are commonly referred to, respectively, as nylon 6,6 and nylon 6.

Both nylon 6,6 and nylon 6 are used in thermoplastic formulations to produce injection molded and extruded articles. In these uses, the melt-flow characteristics of the formulation are important to the article manufacturer. In both injection molding and extrusion, a formulation having a low flow rate, under processing conditions, can result in only partial formation of the article as the formulation does not completely fill the mold or flow evenly through the extruder during the cycle time allotted.

The melt-flow characteristics of thermoplastic formulations are commonly quantified and reported as the melt index in grams/ten minutes as measured under ASTM D 1238-79. A typical melt index for nylon 6,6 is 12 grams/10 minutes. Additives, such as o- or p- toluene sulfonamide may be used to improve the melt index, but such additives can increase the flammability of the formulation or adversely affect the physical properties of articles made from such formulations.

It is common practice to use reinforcing fillers in nylon 6,6 and nylon 6 formulations to increase the tensile and flexural strengths of articles produced therefrom. Glass fibers are commonly used as the reinforcing filler, especially chopped glass fibers about 3 mm long. The glass fiber loading is from about 5–50 weight percent of the formulation, and most often, 30–33 weight percent. While glass fiber is useful in enhancing tensile and flexural strengths, its presence in the formulation significantly degrades its melt-flow characteristics. A typical value for glass fiber reinforced nylon 6,6 is 7 grams/10 minutes as measured by ASTM D 1238-79. Thus, formulations based upon glass reinforced nylon 6,6 or nylon 6 can be very difficult to mold or extrude.

THE INVENTION

This invention relates to thermoplastic formulations which comprise: (1) at least 50 weight percent, based upon the total weight of the formulation, unreinforced nylon selected from nylon 6,6, nylon 6 or mixtures thereof, and (2) a sufficient amount of decabromodiphenyl ethane to provide a melt index value, as measured by ASTM D 1238-79, 265° C./1200 grams, which is higher than the melt index value of such nylon alone.

This invention also relates to thermoplastic formulations which comprise: (1) at least 50 weight percent, based upon the total weight of the formulation, reinforced nylon selected from glass reinforced nylon 6,6, glass reinforced nylon 6 or mixtures thereof, and (2) a sufficient amount of decabromodiphenyl ethane to provide a melt index value, as measured by ASTM D 1238-79, 275° C./550 grams, which is higher than the melt index value of such reinforced nylon alone.

The content of the unreinforced and the reinforced nylons used in the thermoplastic formulations of this invention is preferably from about 60 weight percent to about 90 weight percent, based upon the total weight of the formulation. Preferably, the formulation contains from about 75 weight percent to about 85 weight percent of such nylons.

It is generally preferred that the nylon constituent of the formulation be a mixture of nylon 6,6 and nylon 6 and in a weight ratio of nylon 6 to nylon 6,6 within the range of from about 0.95 to about 0.05, and preferably within the range of from about 0.50 to about 0.10. Processes for the preparation of and the properties of these nylons are discussed in Encyclopedia of Polymer Science and Technology, Vol. 10, pages 553–569, Interscience Publishers, New York, N.Y., and in Kirk-Othmer Encyclopedia of Chemical Technology, 3rd Edition, Vol. 18, pages 405–425, John Wiley & Sons, Inc., both of which are incorporated herein as if fully set forth.

When glass fibers are used, they will comprise from about 5 weight percent to about 50 weight percent, and preferably from 25 weight percent to about 40 weight percent, based upon the total weight of nylon and glass fibers. Most preferably the glass fibers will comprise from about 30 weight percent to about 35 weight percent.

The glass fibers may be any type of glass and of any length which is commonly used in reinforcing nylon. Glass reinforced nylon 6,6 can be obtained commercially, e.g., Vydyne ® R533 (Monsanto Chemical Company), Zytel ® 70G33L, (E. I. duPont de Nemours and Company), and Wellamid ® GF33-66XE-N (Wellman, Inc.), and the like. Glass reinforced nylon 6 is also commercially available, e.g., Nycoa ® 1379, (Nylon Corporation), Dexlon ® 633HI (Dexter Plastics Division of Dexter Corporation, and Dexlon ® 633 (Dexter Plastics Division of Dexter Corporation).

The amount of decabromodiphenyl ethane used to obtain the desired melt index enhancement is best determined empirically. Generally, an amount of decabromodiphenyl ethane within the range of from about 5 weight percent, based upon the total weight of the formulation, to about 20 weight percent will give melt indexes which are suitable for most conventional injection molding and extrusion processes. Amounts in excess of 20 weight percent are not expected to be desirable as such amounts can yield articles having degradation of some physical properties, e.g. impact strength, heat distortion temperature, etc. Preferred amounts are those amounts which give the optimum balance between the melt index sought and the maintenance or enhancement of the other physical properties. For example, an amount with the range of from about 10 weight percent to about 15 weight percent is preferred as the physical properties of articles made from such formulations are good and since, when a flame retardant synergist, such as $Sb_2O_3$, is also present, the articles have excellent flame retardancy, i.e., a UL-94 rating of V-O.

The use of a flame retardant synergist enables the obtainment of good flame retardancy without the undesirable use of large amounts of decabromodiphenyl ethane. Flame retardant synergists are well known to the art. The most commercially significant synergist for use with bromine containing flame retardants is $Sb_2O_3$. Generally, the amount of synergist used is within the range of from about 2 weight percent to about 6 weight percent and preferably from about 2 to about 4 weight percent, all based upon the total weight of the formulation.

The decabromodiphenyl ethane constituent of the formulations of this invention can be prepared by the bromination of diphenyl ethane in the presence of a bromination catalyst, e.g. AlCl₃, and an alkyl halide solvent. See Example I hereof.

The formulation of this invention can be prepared by use of conventional compounding equipment, e.g. a twin-screw extruder or single-screw extruder.

The formulations of this invention can also contain conventional ingredients such as pigments, lubricants, thermal stabilizers, UV stabilizers, antioxidants, etc.

Conventional injection molding and extrusion equipment and conditions are suitable for forming articles from the formulations of this invention.

EXAMPLE I (Preparation of Decabromodiphenyl Ethane)

A 500-mL-resin kettle was equipped with a mechanical stirrer, reflux condenser, a thermometer, a temperature controller and an addition funnel.

The kettle was charged with 320 g of $Br_2$ (2.0 moles) and 1.8 g of aluminum chloride. The 320 g of bromine represents a 100% excess of bromine beyond the stoichiometric amount required for perbromination.

The addition funnel was charged with a solution containing 18.2 g diphenylethane (0.1 mole) and 49.4 g of methylene bromide (20 mL). The solution was added via the funnel dropwise into the kettle over a period of 30 minutes. During the addition, the resultant reaction mass was stirred at room temperature. After the addition was complete, the reaction mass was stirred and heated to reflux (65° C.–67° C.) for 6 hours.

After the 6-hour period had lapsed, the reaction was deemed complete and the reaction mass was cooled to room temperature. Water (150 mL) was added to the reaction mass to deactivate the catalyst. After catalyst deactivation the reaction mass was heated to remove bromine and methylene bromide still present until the vapor obtained was approximately at 100° C.

The solid product was filtered from the remaining solution and washed twice with 100-mL-portions of water and dried at 160° C. for one hour. The product was then oven aged at 200° C. in a forced-air oven for 15 hours. A white decabromodiphenyl ethane product (95.5 g, 98%) was obtained. The product had a melting point of 344° C.–354° C. and an average bromine content of 82.6%.

EXAMPLES II-V

In the following Examples, the formulations indicated were prepared by means of a twin screw extruder. Samples from the so-formed formulations were then tested in accordance with ASTM D 238-79, 265° C./1200 grams for Vydyne ® 21X formulations and 275° C./550 grams for Vydyn ® R533 formulations, to obtain the melt index values. The various formulations were also used to prepare injection molded specimens for use in the UL-94 tests. For Vydyn ® 31X, the injection molding temperature was 260°–265° C. and for Vydyne ® R633, it was 265°–270° C. All percents are weight percent based upon the total weight of the formulation.

EXAMPLES

| Example No. | Formulation | Weight Percent | UL-94 | Melt Index g/10 mins. |
|---|---|---|---|---|
| II | Vydyne ® 21X | 81% | V-O | 26.8 |
| | Decabromodiphenyl Ethane | 14% | | |
| | $Sb_2O_3$ | 5% | | |
| III | Vydyne ® 21X | 81% | V-O | 32.6 |
| | Saytex ® 120 Flame Retardant | 14% | | |
| | $Sb_2O_3$ | 5% | | |
| IV | Vydyne ® R533 | 81% | V-O | 20.4 |
| | Decabromodiphenyl Ethane | 14% | | |
| | $Sb_2O_3$ | 5% | | |
| V | Vydyne ® R533 | 81% | V-O | 7.4 |
| | Saytex ® 120 Flame Retardant | 14% | | |
| | $Sb_2O_3$ | 5% | | |

Vydyne ® 21X is a nylon 6,6 resin sold by Monsanto Chemical Company.
Vydyne ® R533 is a glass reinforced nylon 6,6 resin sold by Monsanto Chemical Company.
Saytex ® 120 flame retardant is a perbrominated diphenoxybenzene product sold by Ethyl Corporation.

EXAMPLES VI AND VII

These Examples are for comparative purposes. Neat Vydyne ® 21X and Vydyne ® R533 were tested for melt index values in accordance with ASTM D 1238-79, 265° C./1200 grams for Vydyne ® 21X and 275° C./550 for Vydyne ® R533. The melt index for Vydyne ® 21X was 12.3 grams/10 minutes while the melt index for Vydyne ® R533 was 6.9 grams/10 minutes. The UL-94 rating for articles made from Vydyne ® 21X is V-2 and for articles made from Vydyne ® R533 the rating is burn.

As can be seen from the above results, the melt index value for Vydyne ® 21X was significantly improved by the presence of Saytex ® 120 flame retardant or decabromodiphenyl ethane in the formulation. The presence of Saytex ® 120 flame retardant in Vydyne ® 21X gave the greatest improvement. Surprisingly, only decabromodiphenyl ethane gave any significant improvement in the melt index value for the glass reinforced nylon, i.e. Vydyne ® R533. Note that for Saytex ® 120 flame retardant, which gave the best results in Vydyne ® 21X, the melt index improvement realized by its use in Vydyne ® R533 was not very good. The melt index improvement obtained with decabromodiphenyl ethane suggests a synergism between the glass in the reinforced nylon and the decabromodiphenyl ethane.

What is claimed is:

1. A thermoplastic formulation comprising:
   (a) at least 50 weight percent, based upon the total weight of said formulation, of an unreinforced nylon selected from nylon 6,6, nylon 6 and mixtures thereof; and
   (b) decabromodiphenyl ethane in an amount sufficient to provide said formulation with a melt index value, as measured by ASTM D 1238-79, which is greater than the melt index value for said unreinforced nylon alone.

2. The formulation of claim 1 wherein said formulation additionally contains a flame retardant synergistic amount of $Sb_2O_3$.

3. The formulation of claim 1 wherein said decabromodiphenyl ethane is present in an amount within the range of from about 5 weight percent to about 20 weight percent, based upon the total weight of the formulation.

4. The formulation of claim 3 wherein said formulation contains from about 2 weight percent to about 6 weight percent $Sb_2O_3$, based upon the total weight of the formulation.

5. The formulation of claim 1 wherein said formulation contains from about 75 weight percent to about 85 weight percent of said unreinforced nylon.

6. The formulation of claim 4 wherein said formulation contains from about 60 weight percent to about 90 weight percent of said nylon.

7. A thermoplastic formulation comprising:
(a) at least 50 weight percent, based upon the total weight of said formulation, of a reinforced nylon selected from glass reinforced nylon 6,6, glass reinforced nylon 6 and mixtures thereof; and
(b) decabromodiphenyl ethane in an amount sufficient to provide said formulation with a melt index value, as measured by ASTM D 1238-79, which is greater than the melt index value for said reinforced nylon alone.

8. The formulation of claim 7 wherein said formulation additionally contains $Sb_2O_3$.

9. The formulation of claim 7 wherein said decabromodiphenyl ethane is present in an amount within the range of from about 5 weight percent to about 20 weight percent, based upon the total weight of the formulation.

10. The formulation of claim 3 wherein said formulation contains from about 2 weight percent to about 6 weight percent $Sb_2O_3$, based upon the total weight of the formulation.

11. The formulation of claim 9 wherein said formulation contains from about 75 weight percent to about 85 weight percent of said reinforced nylon.

12. The formulation of claim 10 wherein said formulation contains from about 60 weight percent to about 90 percent of said reinforced nylon.

* * * * *